US006446774B2

(12) United States Patent
Porter

(10) Patent No.: US 6,446,774 B2
(45) Date of Patent: Sep. 10, 2002

(54) ACTIVE CONTROL OF A HYDRA-MECHANICAL TRACTION CONTROL DEVICE

(75) Inventor: Fred C. Porter, Beverly Hills, MI (US)

(73) Assignee: New Venture Gear, Inc., Troy, MI (US)

(*) Notice: Subject to any disclaimer, the term of this patent is extended or adjusted under 35 U.S.C. 154(b) by 0 days.

(21) Appl. No.: 09/822,612

(22) Filed: Mar. 30, 2001

Related U.S. Application Data

(60) Provisional application No. 60/195,930, filed on Apr. 10, 2000.

(51) Int. Cl.[7] .................... F16D 25/02; F16D 25/0638; F16D 43/284; F16H 48/30
(52) U.S. Cl. ................... 192/35; 192/82 T; 192/85 AA; 192/103 F; 180/197
(58) Field of Search ........................ 192/35, 32, 85 AA, 192/85 A, 103 F, 82 T, 103 R, 85 R, 70.21, 70.11, 87.12, 70.12; 475/88, 90, 89, 86, 83, 43, 149, 231, 204, 322; 180/197

(56) References Cited

U.S. PATENT DOCUMENTS

| | | | | |
|---|---|---|---|---|
| 4,773,500 A | * | 9/1988 | Naito et al. ................. 180/233 |
| 4,966,249 A | * | 10/1990 | Imasaki ....................... 180/233 |
| 5,358,454 A | * | 10/1994 | Bowen et al. | |
| 5,704,863 A | * | 1/1998 | Zalewski et al. ............. 475/88 |
| 5,735,764 A | * | 4/1998 | Shaffer et al. ........... 192/103 F |
| 5,819,194 A | * | 10/1998 | Hara et al. ............... 192/103 F |
| 5,967,285 A | * | 10/1999 | Mohan et al. ............. 192/82 T |
| 6,041,903 A | * | 3/2000 | Burns et al. ............. 192/85 AA |
| 6,161,643 A | * | 12/2000 | Bober et al. ................. 180/249 |
| 6,176,800 B1 | * | 1/2001 | Shaffer et al. ........... 192/103 F |
| 6,183,387 B1 | | 2/2001 | Yoshioka | |
| 6,216,841 B1 | | 4/2001 | Hofer | |
| 6,315,097 B1 | * | 11/2001 | Burns .......................... 192/35 |
| 6,334,500 B1 | * | 1/2002 | Shin ........................... 180/197 |
| 6,354,977 B1 | * | 3/2002 | Brown et al. | |
| 6,360,156 B1 | * | 3/2002 | Morganruth et al. .......... 701/69 |
| 6,378,682 B1 | * | 4/2002 | Mohan et al. ........... 192/103 F |
| 6,381,530 B1 | * | 4/2002 | Vogt ............................. 701/69 |
| 2001/0035323 A1 | * | 11/2001 | Porter ........................ 192/35 |

* cited by examiner

Primary Examiner—Douglas C. Butler
(74) Attorney, Agent, or Firm—Harness, Dickey & Pierce P.L.C.

(57) ABSTRACT

The hydraulic coupling includes a multi-plate clutch assembly operatively connecting a pair of rotary members, an actuator assembly for actuating the clutch assembly, and a fluid control system operable for controlling actuation of the actuator assembly. The actuator assembly includes a hydraulic pump and a piston mounted in a piston chamber for movement relative to the multi-plate clutch assembly. The fluid control system includes an electrically-controlled flow control valve operable for regulating the fluid pressure delivered to the piston chamber. The position of the valve element is controlled by an electronic traction control module that monitors and responds to certain vehicle operating conditions, including a sump fluid temperature, a coupling outlet oil temperature, the four wheel speeds, and the piston chamber pressure. The electronic traction control module sends a control signal to the PWM control valve for modulating the hydraulic pressure supplied to the piston chamber, which, in turn, controls clutch engagement.

11 Claims, 3 Drawing Sheets

ACTIVE CONTROL OF A HYDRA-MECHANICAL TRACTION CONTROL DEVICE

This application claims priority for domestic application No. 60/195,930 filed Apr. 10, 2000.

FIELD OF THE INVENTION

The present invention relates generally to couplings for use in motor vehicle driveline applications. More specifically, the coupling includes a hydraulic pump, a transfer clutch coupled between a pair of rotary members, and a fluid distribution system for controlling actuation of the transfer clutch.

BACKGROUND OF THE INVENTION

Hydraulic couplings are used in a variety of motor vehicle driveline applications for limiting slip and transferring drive torque between a pair of rotary members. In all wheel drive applications, hydraulic couplings have been used to automatically control the transfer of drive torque from a driven member to a non-driven member in response to speed differentiation therebetween. In limited slip applications, such as used in association with a differential in an axle assembly, full-time transfer case, or transaxle, hydraulic couplings have been used to limit slip and bias the torque split between two rotary members. Examples of known hydraulic couplings which are adaptable for such driveline applications include viscous couplings, geared traction units, and passively and electronically-controlled hydraulically-actuated friction clutches generally similar to those shown and described in U.S. Pat. Nos. 5,148,900, 5,358,454, 4,649,459, 5,704,863, 5,779,013, and 6,051,903.

In response to increased consumer demand for motor vehicles with traction control systems, hydraulic couplings are currently being used in a variety of driveline applications. Such hydraulic couplings rely on hydromechanics and pressure-sensitive valve elements to passively respond to a limited range of vehicle operating conditions. These hydraulic couplings are susceptible to improvements that enhance their performance, such as a more controlled response to a wider range of vehicle operating conditions. With this in mind, a need exists to develop improved hydraulic couplings that advance the art.

SUMMARY OF THE INVENTION

Accordingly, the present invention provides a hydraulic coupling for use in motor vehicle driveline applications for rotatively coupling a pair of rotary members to limit speed differentiation and transfer drive torque therebetween.

The hydraulic coupling according to the present invention generally includes a multi-plate clutch assembly operatively connecting a pair of rotary members, an actuator assembly for actuating the clutch assembly, and a fluid control system operable for controlling actuation of the actuator assembly. The actuator assembly includes a hydraulic pump and a piston mounted in a piston chamber for movement relative to the multi-plate clutch assembly. The fluid control system regulates the fluid pressure supplied to the piston chamber by the hydraulic pump to control the clutch engagement force exerted by the piston on the clutch assembly. The fluid control system includes an electrically-controlled flow control valve operable for regulating the fluid pressure delivered to the piston chamber. Preferably, the flow control valve is a pulse-width modulated (PWM) valve having a moveable valve element. The position of the valve element is controlled by an electronic traction control module that monitors and responds to certain vehicle operating conditions including, without limitation, a sump fluid temperature, a coupling outlet oil temperature, the four wheel speeds, and the piston chamber pressure. The electronic traction control module sends a control signal to the PWM control valve for modulating the hydraulic pressure supplied to the piston chamber, which, in turn, controls clutch engagement.

BRIEF DESCRIPTION OF THE DRAWINGS

Further objects, features and advantages of the present invention will become readily apparent from the following detailed specification and the appended claims which, in conjunction with drawings, set forth the best mode now contemplated for carrying out the invention. Referring to the drawings:

DETAILED DESCRIPTION OF THE PREFERRED EMBODIMENTS

In general, the present invention is directed to an actively-controlled hydromechanical limited slip and torque transfer apparatus, hereinafter referred to as a hydraulic coupling. The hydraulic coupling is well-suited for vehicular driveline applications requiring torque transfer or slip limiting control between a pair of rotary members. Driveline applications for the hydraulic coupling include, but are not limited to, limited slip axle differentials, power take-offs and in-line coupling for all-wheel drive vehicles, on-demand couplings and limited slip differentials in four-wheel drive transfer cases, and limited slip differentials in transaxles.

Figure 1:
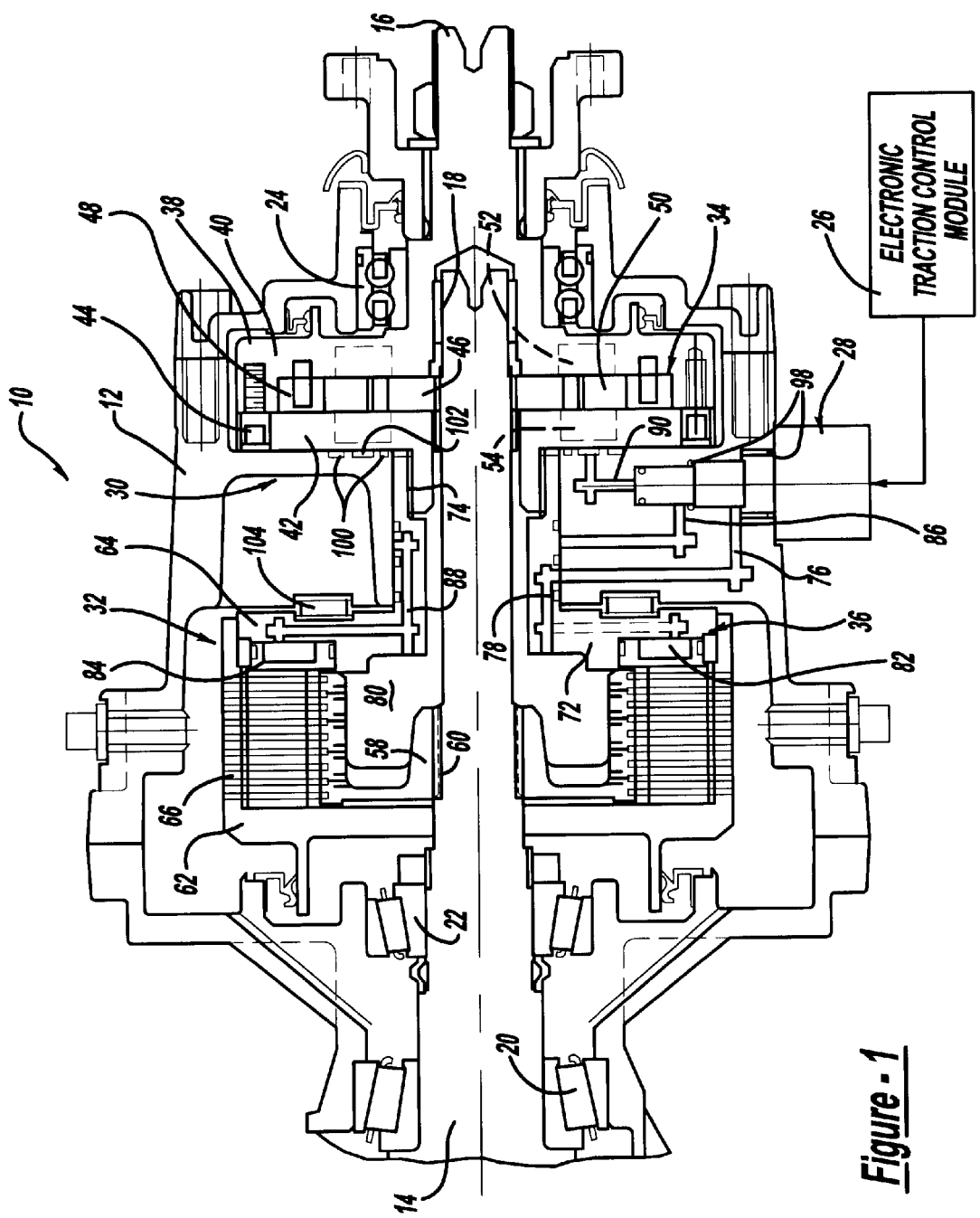
FIG. 1 is a sectional view illustrating a hydraulic coupling according to the present invention operatively coupled between first and second rotary members.

Referring initially to FIG. 1 of the drawings, a hydraulic coupling according to a preferred embodiment of the present invention is generally identified with reference numeral 10. As specifically shown in FIG. 1, hydraulic coupling 10 is located in a driveline apparatus having a housing 12 and is operatively coupled between a first rotary member, hereinafter referred to as first shaft 14, and second rotary member, hereinafter referred to as second shaft 16. Shafts 14 and 16 are rotatable relative to one another, with first shaft 14 being supported by a bearing assembly 18 for rotation relative to second shaft 16. Bearings 20 and 22 and 24 are also provided for supporting shaft 14 and 16, respectively, for rotation relative to housing 12. As will become apparent, hydraulic coupling 10 is controlled by an electronic traction control module 26 for automatically controlling torque transfer and speed differentiation between shafts 14 and 16. Electronic traction control module 26 monitors vehicle system information and hydraulic coupling information including, but not limited to, wheel speed, oil sump temperature, oil outlet temperature, clutch pressure, and controls a pulse-width modulated (PWM) flow control valve assembly 28 associated with hydraulic coupling 10.

In general, hydraulic coupling 10 comprises two portions: an actuator assembly 30, and a transfer clutch 32 for transferring drive torque from a faster rotating shaft to a slower rotating shaft in response to excessive speed differentiation therebetween. Transfer clutch 32 is a hydraulically-actuated multi-plate clutch assembly operably coupled between first shaft 14 and second shaft 16. Actuator assembly 30 includes a hydraulic pump 34 and a piston assembly 36. Hydraulic pump 34 is confined within a cover assembly 38 which includes a cylindrical outer drum 40 and a cover plate 42 secured via fasteners 44 thereto. Cover assembly 38 is fixed for rotation with second shaft 16 and, in the embodiment shown, outer drum 40 is integral with second shaft 16. Preferably, hydraulic pump 34 is a bi-directional gerotor pump having a first toothed pump member 46 fixed (i.e., splined) for rotation with first shaft 14, an eccentric ring 48 fixed to outer drum 40, and a second toothed pump member 50 therebetween. With such an arrangement, relative rotation between first shaft 14 and second shaft 16 results in a pumping action which draws fluid from an inlet chamber 52 on the suction side of pump 34 to an outlet chamber 54 on the discharge side of pump 34. To facilitate pumping action in both directions of rotation, hydraulic pump 34 includes suitable one-way check valves similar to the arrangement shown in commonly-owned U.S. Pat. No. 6,041,903 which is incorporated by reference. Inlet chamber 52 is in fluid communication with fluid-filled sump 56 (FIG. 2) provided within housing 12.

Transfer clutch 32 includes a clutch hub 58 fixed via a splined connection 60 to first shaft 14, an outer drum 62 coupled via a piston housing 64 to cover assembly 38, and a clutch pack 66 having a plurality of inner clutch plates fixed (i.e., splined) to clutch hub 56 that areinterleaved with a plurality of outer clutch plates fixed (i.e., splined) to outer drum 62. Outer drum 62 is journaled for rotation relative to first shaft 14. In addition, outer drum 62 is rigidly connected (i.e., welded) to an end plate segment 72 of piston housing 64 which, in turn, is fixed via splined connection 74 to cover plate 42. A first exhaust passage 76 formed in housing 12 communicates with a second exhaust passage 78 in piston housing 64 for exhausting fluid from PWM flow control valve assembly 28 into a clutch chamber 80 to provide an adequate supply of lubricating fluid for cooling and lubricating clutch pack 66.

Piston assembly 36 includes a piston chamber 82 that is formed in plate segment 72 of piston housing 64, and an actuation member or piston 84 disposed in annular piston chamber 82. Piston 84 is supported for axial sliding movement within piston chamber 82 relative to interleaved multi-plate clutch pack 66 for selectively applying a compressive clutch engagement force thereon, thereby transferring drive torque from first shaft 14 (via clutch hub 58) to second shaft 16 (via drum 62, piston housing 64, and cover assembly 38) or vise versa.

A first fluid supply passage 86 is formed in housing 12 between PWM flow control valve assembly 28 and piston chamber 82. First supply passage 86 communicates with a second supply passage 88 formed in piston housing 64. An inlet passage 90 is formed in housing 12 for providing fluid communication between outlet chamber 54 of pump 34 and the inlet to PWM flow control valve assembly 28. A pressure relief valve 92 is provided in inlet passage 90 for preventing the pressure delivered to control valve assembly 28 from exceeding a predetermined maximum level. The amount of drive torque transferred is proportional to the magnitude of the clutch engagement force exerted by piston 84 on clutch pack 66 which, in turn, is a function of the fluid pressure within piston chamber 82. The magnitude of the control fluid pressure ($P_C$) delivered to piston chamber 82 is determined by PWM flow control valve assembly 28 which has a moveable valve element, the position of which is controlled by an electric control signal generated by control module 26.

The remaining fluid is exhaust through passages 76 and 78 at an exhaust pressure ($P_E$) which is the difference between the pump pressure $P_G$ generated by gerotor pump 34 and the control pressure $P_C$. As is known, the control pressure $P_C$ can be closely controlled due to the use of PWM valve 28.

As seen, ring seals 98 are provided for sealing piston housing 64 for rotation relative to housing 12. Ring seals 98 allow fluid passages 76 and 86 to communicate between housing 12 and piston housing 64. Moreover, ring seals 100 are provided between cover plate 42 and housing 12 to provide a fluid tight seal therebetween. An annular chamber 102 formed in housing 12 provides fluid communication between outlet chamber 54 and inlet passage 90. A thrust bearing 104 is shown between housing 12 and plate segment 72 of piston housing 64.

It was previously noted that electronic control module 26 monitors vehicle system information and certain hydraulic coupling information including wheel speed, oil sump temperature, the oil outlet temperature, and clutch pressure. In particular, the wheel speeds are detected by four (4) wheel speed sensors 106A–106D which are disposed on, or in close proximity to, each of the vehicles' wheels. The oil sump temperature is measured by a first temperature sensor 106 which is disposed in oil sump 56. The oil outlet temperature is detected by a second temperature sensor 108 located in proximity to the terminal end of second exhaust passage 78. The clutch pressure is detected by a clutch pressure sensor 110 which may be disposed in piston chamber 82 or in one of supply passages 86 and 88.

Figure 2:
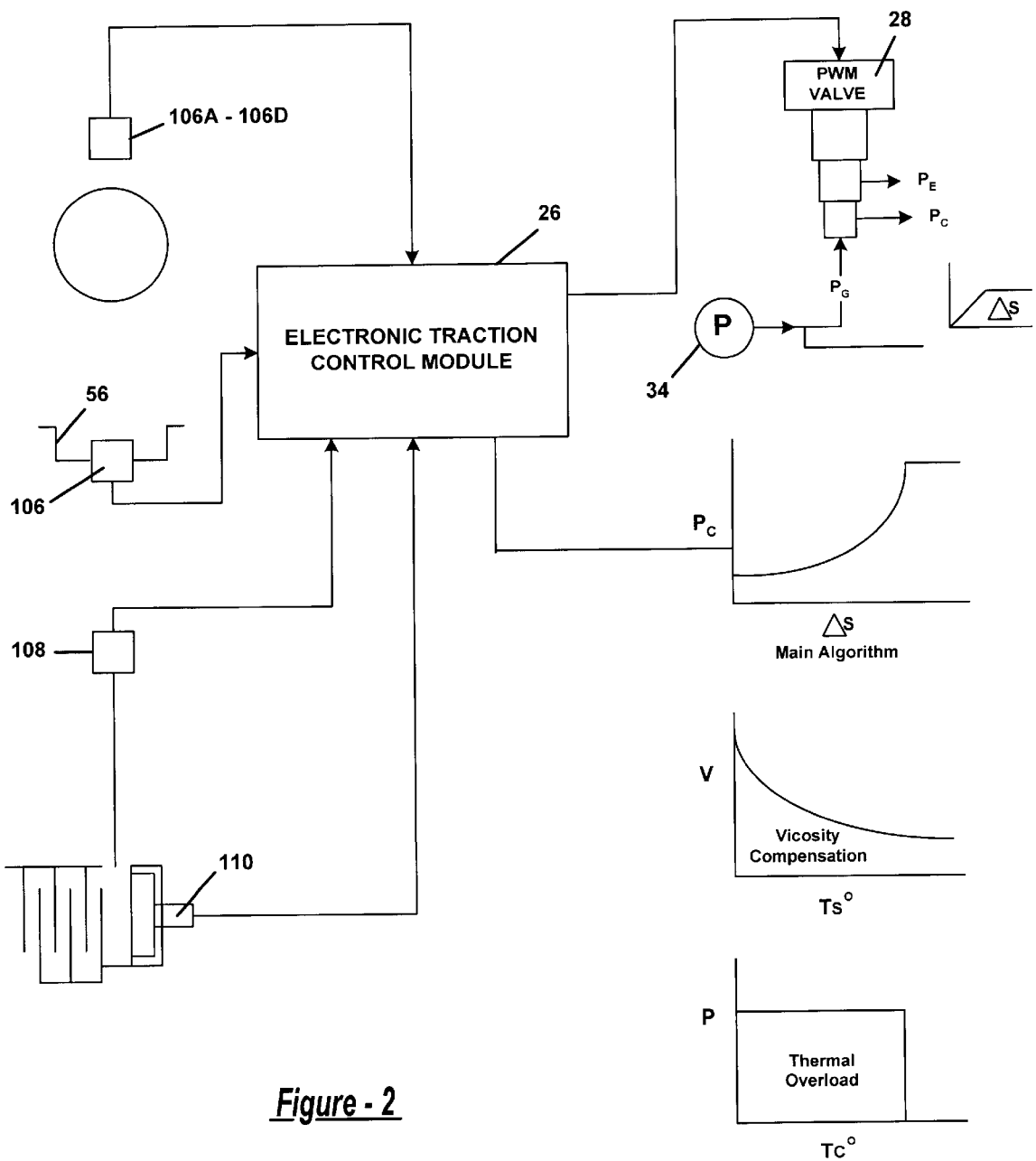
FIG. 2 is a schematic illustration of a hydraulic circuit associated with the hydraulic coupling of FIG. 1.
Figure 3:
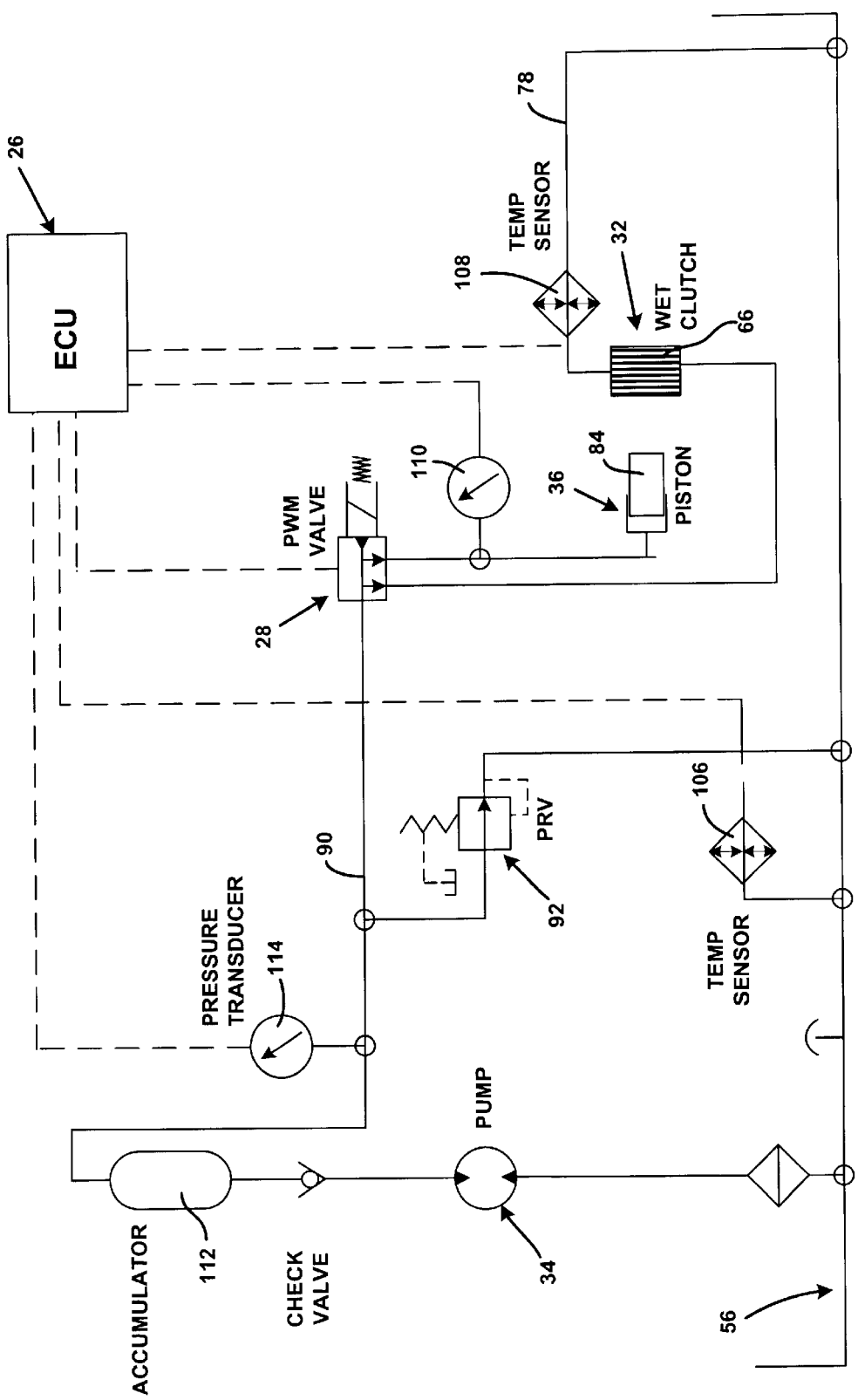
FIG. 3 is a diagramatical illustration of the hydraulic circuit.

The electronic control module 26 employs a main algorithm which determines the desired clutch pressure based upon the difference in front wheel and rear wheel speed ($\Delta_S$). An exemplary characteristic curve for $P_C$ versus $\Delta$s is shown in FIG. 2 to illustrate the manner in which the control pressure $P_C$ can be controlled to change with $\Delta_S$. The present invention functions to modulate the clutch apply pressure through the use of PWM solenoid valve 28 with the main algorithm control logic and closed loop control. Lacking any difference in speed between shafts 14 and 16, pump 34 turns as a unit and creates no hydraulic flow. Upon introduction of differential speeds, the pump elements begin relative motion and commence hydraulic flow. The pressure generated by pump 34 is fed to inlet passage 90 for delivery to the inlet of PWM solenoid valve 28. Pulsations in pressure due to gerotor lobes may need to be dampened with an accumulator 112 or other suitable means. The PWM valve duty cycle is controlled electronically by electronic control module 26 based upon the logic of the main algorithm and inputs from wheel speed sensors 104 and 104D (ABS), pressure transducer 110 and temperature sensors 106 and 108. A second pressure transducer 114 can be used to provide a pressure signal to controller 26 from inlet passage 90. The wheel speed sensors are used to control the duty cycle of the PWM valve 28 that, in turn, controls the pressure being fed to piston chamber 82. They also signal controller 26 that a non-standard tire size (mini-spare) is on the vehicle so that the system can be deactivated or operating characteristics can be changed.

Pressure transducer 110 signals controller 26 how much torque is being transferred so that logic can control the torque according to predetermined requirements. It also can be used to limit the maximum torque transfer so that the system components can be down sized for mass and cost savings. Sump temperature sensor 106 is used to compensate for fluid viscosity changes on the inlet side of pump 34. An exemplary viscosity compensation chart is shown in FIG. 2 (labled "viscosity compensation"). With the fluid viscosity (V) decreasing as the sump fluid temperature ($T_S$) increase. The clutch outlet oil temperature sensor 108 is used to deactivate transfer clutch 32 during thermally abusive operation, thereby preventing clutch damage. An exemplary clutch deactivation curve is shown in FIG. 2 (labeled "thermal overload").

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hydraulic coupling for use in a driveline apparatus for a motor vehicle to rotatively couple first and second rotary members, the hydraulic coupling comprising:

a transfer clutch operatively connected between the first and second rotary members;

a piston housing defining a piston chamber;

a piston disposed in said piston chamber and actuable to engage said transfer clutch and rotatively couple the first and second rotary members;

a hydraulic pump in fluid communication with a sump containing hydraulic fluid and providing a pumping action in response to relative rotation between the first and second rotary members;

a first fluid flow path for supplying hydraulic fluid from said hydraulic pump to said piston chamber;

a control valve located in fluid communication with said first flow path for regulating flow of hydraulic fluid into said piston chamber for actuating said piston;

a second flow path for supplying hydraulic fluid from said control valve to a clutch chamber to cool said transfer clutch;

a first temperature sensor for detecting the temperature of hydraulic fluid in said sump;

a second temperature sensor for detecting the temperature of hydraulic fluid in said clutch chamber;

a pressure sensor for detecting the pressure of fluid in said piston chamber; and an electronic traction control module controlling actuation of said control valve in response to sensor signals from said sensors.

2. The hydraulic coupling of claim 1 wherein said transfer clutch includes a hub fixed for rotation with the first rotary member, a drum fixed for rotation with the second rotary member, and a multi-plate clutch pack interconnected between said hub and said drum.

3. The hydraulic coupling of claim 2 wherein said piston housing is connected between said drum and a pump cover assembly that is fixed to the second rotary member, said hydraulic pump being retained in said pump cover assembly and having a first pump member fixed for rotation with said cover assembly and a second pump member fixed for rotation with the second rotary member such that relative rotation between said first and second pump members generates said pumping action.

4. The hydraulic coupling of claim 1 wherein said first temperature sensor generates a first temperature signal that is delivered to said control module, said control module having logic for modifying controlled actuation of said control valve in response to variations in said first temperature signal which are sensor indicative of fluid viscosity changes.

5. The hydraulic coupling of claim 4 wherein said second temperature sensor generates a second temperature signal that is delivered to said control module, said control module having logic for releasing said transfer clutch when said second temperature signal exceeds a predetermined maximum value.

6. The hydraulic coupling of claim 5 wherein said pressure sensor sends a pressure signal to said control module for limiting the maximum torque transferred by said transfer clutch when said pressure exceeds a predetermined maximum value.

7. The hydraulic coupling of claim 1 wherein said second temperature sensor generates a second temperature signal that is delivered to said control module, said control module having logic for releasing said transfer clutch when said second temperature signal exceeds a predetermined maximum value.

8. The hydraulic coupling of claim 7 wherein said pressure sensor sends a pressure signal to said control module for limiting the maximum torque transferred by said transfer clutch when said pressure exceeds a predetermined maximum value.

9. The hydraulic coupling of claim 1 wherein said pressure sensor sends a pressure signal to said control module for limiting the maximum torque transferred by said transfer clutch when said pressure exceeds a predetermined maximum value.

10. The hydraulic coupling of claim 1 further comprising first and second speed sensors to measure the rotary speed of the first and second rotary members and send first and second speed signals to said control module, said control module operable to control actuation of said transfer clutch in response to a speed differential between the rotary members.

11. The hydraulic coupling of claim 1 further comprising a housing rotatably supporting the first and second rotary members, said housing defining a valve body receiving said control valve and having an inlet passage communicating with an outlet of said pump, a first supply passage, and a first exhaust passage, said piston housing defining a second supply passage in communication with said piston chamber and said first supply passage, and a second exhaust passage in communication with said first exhaust passage, said control valve operable to deliver high pressure fluid through said first and second supply passages to said piston chamber and to deliver low pressure fluid through said first and second exhaust passages to said clutch chamber.

* * * * *